United States Patent Office 3,182,243
Patented May 4, 1965

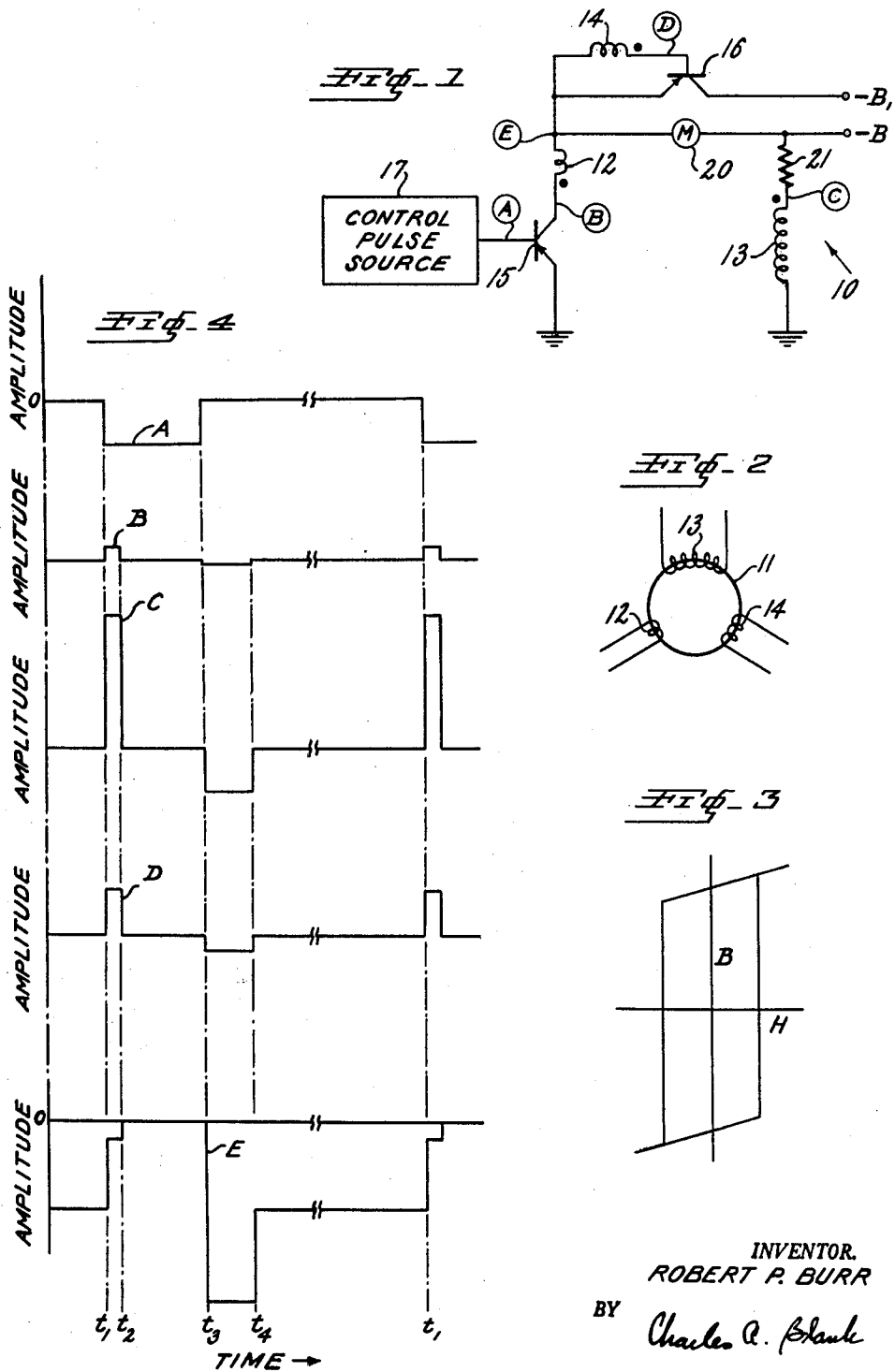

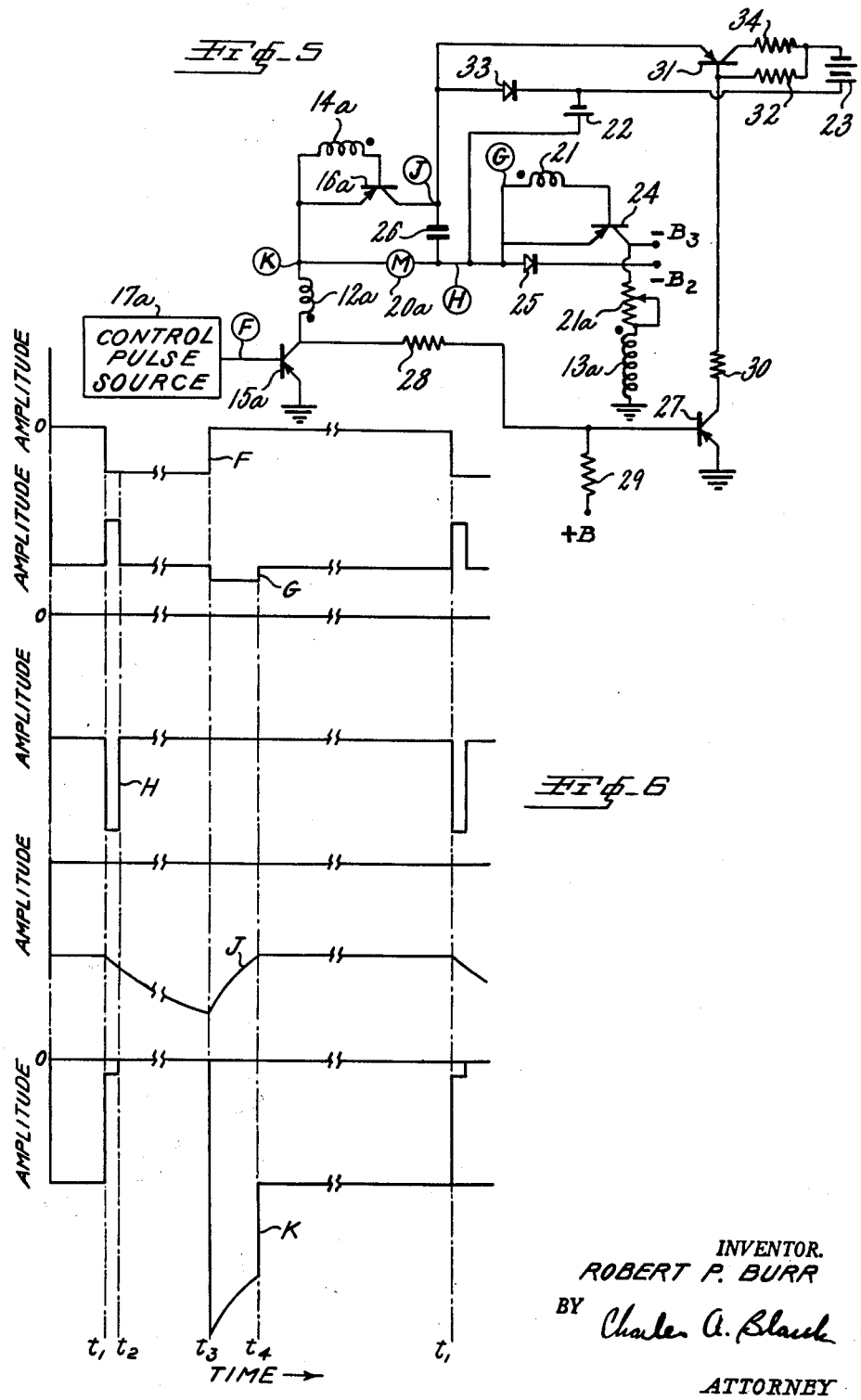

3,182,243
PULSE-DEVELOPING CONTROL CIRCUIT
Robert P. Burr, Lloyd Harbor, Huntington, N.Y., assignor to Circuit Research Company, Glen Cove, N.Y., a partnership of New York
Filed June 28, 1961, Ser. No. 120,256
8 Claims. (Cl. 318—269)

This invention relates to control circuits and, more particularly, to circuits of the type suitable for controlling the energization of a motor in a tape reader in which the tape is started and stopped many times a second. Such a tape reader utilizing a printed-circuit motor has been described in my copending application Serial No. 12,411, now Patent No. 3,044,695, filed March 2, 1960 and entitled "Electro-Optical System."

The present application is a continuation-in-part of my copending application Serial No. 93,712, now abandoned, filed March 6, 1961 and entitled "Control Circuit."

In order to drive the printed-circuit motor of a tape reader, the motor can be energized by current flow through a power transistor controlled by a suitable source of control pulses. If it is desired to stop the motor substantially instantaneously upon the termination of each pulse, in accordance with the present invention, the motor can be energized in the opposite sense for a brief period of time.

Also in accordance with the present invention, the energization of the motor in the opposite sense can be controlled in accordance with the selected mode of operation of the motor. That is, when the motor operates in a step-by-step mode and does not reach maximum speed while energized in the forward sense for only a short period of time, the energization of the motor in the opposite sense is controlled to be of selected magnitude. When the motor operates in a continuous or slewing mode and reaches maximum speed in the forward sense for an indefinite long period of time, the energization of the motor in the opposite sense is controlled to be of larger magnitude to cause the motor to stop substantially instantaneously at a selected position notwithstanding the higher forward momentum.

Also in accordance with the invention, the energization of the motor in the forward sense can be accelerated readily during the initial portion of the control pulse to minimize the time between steps and thereby to increase the reading capability of the tape reader.

It is an object of the present invention to provide a new and improved control circuit for developing an output pulse of desired polarity upon the termination of a control pulse.

It is another object of the invention to provide a new and improved control circuit of simple and inexpensive construction suitable for controlling the energization of a motor of a tape reader.

It is another object of the invention to provide a new and improved control circuit for controlling the energization of a motor of a tape reader in both step-by-step and slewing modes.

In accordance with the invention, a control circuit comprises a pulse transformer including a saturable magnetic core and primary, secondary and tertiary windings magnetically coupled thereto. The control circuit includes circuit means for supplying a control pulse to the primary winding to saturate the core in one sense and circuit means for supplying current flow through the secondary winding to saturate the core in the other sense and to develop an output pulse at the tertiary winding upon the termination of the aforesaid control pulse.

For a better understanding of the present invention, together with other and further objects thereof, reference is made to the following description, taken in connection with the accompanying drawings, and its scope will be pointed out in the appended claims.

Referring now to the drawings:
FIG. 1 is a circuit diagram of a control circuit constructed in accordance with the invention;
FIG. 2 in a schematic diagram of a saturable transformer utilized in the FIG. 1 circuit;
FIG. 3 is a diagram of the hysteresis loop characteristic of the transformer of FIG. 2;
FIG. 4 is an amplitude-time graph used in explaining the operation of the FIG. 1 circuit;
FIG. 5 is a circuit diagram of a modified control circuit constructed in accordance with the invention; and
FIG. 6 is an amplitude-time graph used in explaining the operation of the FIG. 5 circuit.

Referring now more particularly to FIG. 1 of the drawings, a control circuit 10 constructed in accordance with the invention comprises a pulse transformer including a saturable magnetic core 11 (FIG. 2) and primary, secondary and tertiary windings 12, 13, 14, respectively, magnetically coupled thereto. The control circuit preferably includes a direct-current source having three potential terminals $-B_1$, $-B$, and ground, for example, $-12$ volts, $-6$ volts, and zero volts, respectively.

The control circuit includes a motor 20 coupled in series with the primary winding 12 across $-B$ and ground terminals of the direct-current source and also in series with first normally nonconductive circuit means comprising a transistor 15. The motor is also coupled in series with second normally nonconductive circuit means comprising a transistor 16 across terminals $-B$, $-B_1$ of the direct-current source.

The control circuit also includes second means for supplying an input pulse to the primary winding to saturate core 11 in one sense. This circuit means comprises a control pulse generator of conventional construction and transistor 15 for supplying to the primary winding control pulses having a pulse duration of, for example, 4 milliseconds and a repetition frequency of, for example, 100 per second. The control pulse source 17 is effective to supply pulses to the transistor 15 to render that transistor conductive to pass current through the primary winding 12 and the motor to saturate the core in one sense and to energize the motor in one sense.

The secondary winding 13 is coupled to the direct-current source through a resistor 21 for saturating the core in the other sense to develop an output pulse at the tertiary winding 14 upon the termination of each control pulse.

The tertiary winding 14 is coupled across the base-emitter circuit of the transistor 16 for rendering that transistor conductive to energize the motor for a short period in the other sense upon the termination of the control pulse and thereby to stop the motor rapidly upon termination of the control pulse.

Considering now the operation of the FIG. 1 circuit, as will be apparent from FIG. 3, the hysteresis loop characteristic (flux density B-magnetizing force H) is substantially rectangular and is effective, with other circuit parameters mentioned subsequently, to control the pulse duration at the tertiary winding of the transformer. If it is assumed that the magnetic core is capable of containing 18,500 lines of flux when saturated in either sense, the core can be shifted or switched from saturation in one sense to saturation in the other sense by a small change of the net magnetizing current in the windings of, for examples 100 milliamperes in winding 13. Thus, when the current level through the transformer changes, the transformer generates a pulse for a brief interval of time as determined by the hysteresis loop characteristic and in accordance with the equation to be explained hereinafter.

Referring now to FIG. 4, the control pulse source 17 generates repetitive control pulses as represented by curve A having a duration of, for example, 4 milliseconds. The pulses render the transistor 15 conductive during time interval $t_1$–$t_3$ by current flow from the ground terminal through the transistor 15, through the primary winding 12, and the motor 20 to the terminal —B. The current flow through the primary winding 12 at time $t_1$ causes the pulse transformer to attain saturation in a given sense by time $t_2$. As a result, pulses represented by curves B, C, and D are generated across each of the windings 12, 13, 14. The pulses of curves B, C, and D are the pulses at points B, C and D with respect to the other terminal of each winding of the transformer. The potential at point E with respect to ground is represented by curve E.

After the pulse transformer is saturated no output pulse appears across the secondary and tertiary windings. However, when the control pulses are terminated at time $t_3$, current flow through the secondary winding and the series-connected resistor 21 to the terminal —B causes saturation of the core 11 in the opposite sense, developing at time $t_3$ the pulses represented by curves B, C, and D across the windings. The pulse represented by curve D is effective to render the transistor 16 conductive, driving current flow through the motor in the opposite sense to stop the motor rapidly.

The duration of the pulse generated in the tertiary winding 14 is determined in accordance with the hysteresis loop characteristic. The circuit may be designed as follows. The primary winding 12 may have, for example, 2 turns; the secondary winding 13 may have, for example, 18 turns; and the tertiary winding 14 may have, for example, 6 turns. The resistor may have an impedance of, for example, 9 ohms. The impedance reflected from the secondary circuit to the primary circuit is 9 ohms divided by the turns ratio squared and is, therefore, $\frac{1}{9}$ ohm. During the transient period at the instant of starting the motor while the flux is changing toward saturation, the voltage drop across the primary winding, if the motor armature has an impedance of $\frac{1}{2}$ ohm, is approximately 1 volt, with the terminal —B at 6 volts. Accordingly, the core saturates after 740 microseconds, in accordance with the following equation:

$$e = N\frac{d\phi}{dt} \times 10^{-8}$$

where:

$e$ represents the voltage drop across the primary winding 12 (1 volt)

N represents the number of turns of the primary winding 12 (2 turns)

$d\phi$ represents the total change of flux lines from saturation in one sense to saturation in the other sense (37,000 lines)

$dt$ represents the time required to switch from saturation in one sense to saturation in the other sense.

At time $t_3$ when the control pulse terminates, with the base impedance of the transistor 16 being approximately 1 ohm, the impedance reflected to the secondary winding 13 from the tertiary winding 14 is 9 ohms. The voltage drop across the secondary winding then is 3 volts because of resistor 21 and the voltage drop across the tertiary winding is 1 volt during the transient period prior to saturation. In accordance with foregoing equation, therefore, the generated pulse across the tertiary winding at time $t_3$ has a duration of 2.22 milliseconds.

Referring now more particularly to FIG. 5 of the drawings, the control circuit there represented includes components similar to those of the FIG. 1 embodiment and corresponding components are indicated by corresponding reference numerals with the suffix $a$. The pulse transformer of the FIG. 5 circuit includes on its saturable core a fourth winding 21 for a purpose to be described hereinafter. The direct-current source has terminals —$B_2$, —$B_3$, ground, and +B, for example, —8 volts, —14 volts, zero volts, and +3 volts respectively. Batteries 22 and 23 develop potentials of, for example, 6 volts and 50 volts, respectively.

The primary winding 12$a$ may have, for example, 2 turns; the secondary winding 13$a$ may have, for example, 18 turns; the tertiary winding 14$a$ may have, for example, 6 turns and the fourth winding 21 may have, for example, 4 turns.

The FIG. 5 circuit includes normally non-conductive circuit means comprising a transistor 24 coupled between the terminal —$B_3$ and the motor 20$a$. The fourth winding 21 is coupled across the emitter-base electrodes of the transistor 24. The winding 21 is effective to render the transistor 24 conductive during the initial portion of the control pulse supplied by the control pulse source 17$a$ prior to saturation of the core to increase the current flow through the motor during the initial portion of the control pulse. The motor 20$a$ is coupled through a diode 25 to othe terminal —$B_2$ to supply a conductive path for the motor when the transistor 24 is not conductive.

The collector of transistor 16$a$ is connected to a condenser 26 having its other terminal connected to the motor 20$a$. The FIG. 5 circuit also includes circuit means responsive to the output pulse at the tertiary winding 14$a$ and coupled to the condenser 26 and to the motor 20$a$ for passing current through the motor in the reverse sense with an amplitude controlled by the potential on the condenser 26 and with a duration controlled by the output pulse. This circuit means comprises a transistor 27 coupled through resistor 28 to the transistor 15$a$ and biased to cutoff by source +B through resistor 29. The collector of transistor 27 is coupled through resistor 30 to the base of a transistor 31 and through resistor 32 to the negative terminal of battery 23 which is in series with battery 22, motor 20$a$ and transistor 15$a$ when conductive to provide a conductive path for the transistor 27.

As will be explained subsequently, under predetermined operating conditions, the transistor 31 provides a conductive path for the condenser 26 through resistor 34 across the batteries 22 and 23. A diode 33 connects the condenser 26 across the battery 22 to establish a minimum potential of —6 volts across the condenser and provide a source of voltage for transistor 16$a$ when the condenser 26 is only partially charged.

Considering now the operation of the FIG. 5 circuit with reference to the graph of FIG. 6, the control pulse source 17$a$ supplies pulses which render the transistor 15$a$ conductive during time interval $t_1$–$t_3$ by current flow from the ground terminal through the transistor 15$a$, through the primary winding 12$a$, the motor 20$a$, and the transistor 24 to the terminal —$B_3$. The current flow through the primary winding 12$a$ at time $t_1$ causes the pulse transformer to attain saturation by time $t_2$. Pulses similar to those developed across the windings 12, 13, and 14 of FIG. 1 are developed across the windings 12$a$, 13$a$ and 14$a$ of FIG. 5. Also, a pulse represented by curve G is developed across the fourth winding 21. The transistor 24 is rendered conductive by the pulse across winding 21 during the interval $t_1$–$t_2$ to apply an increased negative potential of, for example, —14 volts to the motor terminal during the interval $t_1$–$t_2$ to increase the current flow through the motor above the current level when the transistor 24 is nonconductive. The potential at the motor terminal H is represented by curve H.

At time $t_2$ when the core saturates, the transistor 24 becomes non-conductive and the current flow through the motor then flows through diode 25 to the terminal —$B_2$. Accordingly, for the brief interval of time prior to saturation of the core the motor is accelerated to minimize the time between discrete steps of the motor.

At time $t_1$ when the transistor 15$a$ becomes conductive, it renders the transistor 27 nonconductive. The transistor 27, in turn, renders the transistor 31 conductive to apply the potential of battery 23 in addition to the potential of battery 22 across the condenser 26 through resistor 34 and the transistor 31. The condenser then charges in accordance with a long RC time constant during the interval $t_1$–$t_3$, as indicated by curve J which represents the potential across condenser 26. The maximum potential attained by the condenser is controlled by the period of conduction of the transistor 15a corresponding to the operating period of the motor 20a in the forward sense.

At the time $t_3$ the transistor 16a is rendered conductive by the pulse developed across the transformer 14a similar to that developed across the transformer 14 of FIG. 1 at time $t_3$. Current then flows through the motor 20a and the transistor 16a to discharge the condenser 26. The potential at the terminal of the condenser connected to the collector of transistor 16a is represented by curve J at the time $t_3$. The potential at the motor terminal K is represented by curve K.

The circuit may also be so designed by limiting the conduction of transistor 16a that the condenser 26 does not fully discharge to −6 volts during the interval $t_3$–$t_4$. A more negative equilibrium condition for the condenser potential is established in such a circuit and the decelerating force on the motor can be altered accordingly.

The motor may be operated in a continuous or slewing mode by, for example, generating in the control pulse source 17a a pulse of long duration. Under this operating condition, the condenser 26 charges during a longer time interval to a more negative potential during the forward operation than that represented by curve J. Accordingly, the current flow in the reverse direction through the motor at the termination of the forward operation is greater than the reverse current flow during step-by-step operation and the motor can be stopped substantially instantaneously notwithstanding its higher forward momentum. Thus, the magnitude of the reverse current flow is controlled in accordance with the mode of operation of the motor.

By charging condenser 26 to a sufficiently high potential, the motor may even be caused to rotate in the reverse sense, if desired to compensate for any overshooting of tape position which may occur in some tape readerts while stopping.

While applicant's invention is not limited to any particular circuit constants, parameters and operating conditions, a circuit constructed in accordance with the FIG. 5 embodiment having the following values has been found to operate satisfactorily:

| | |
|---|---|
| Transistor 15a | Type 2N278 Delco Radio Division. |
| Transistors 16a and 24 | Type 2N278 Delco Radio Division. |
| Transistor 27 | Type 2N525 General Electric. |
| Transistor 31 | Type 2N392 Delco Radio Division. |
| Diodes 25 and 33 | Type 1N2154 General Electric. |
| Resistor 21a | 25 ohms max. (adjustable). |
| Resistor 28 | 4.7 kilohms. |
| Resistor 29 | 6.8 kilohms. |
| Resistors 30 and 32 | 1 kilohm. |
| Resistor 34 | 100 ohms. |
| Condenser 26 | 1000 μf. |
| Motor 20a | Type 368HFA (Printed Motors, Inc., New York, N.Y.). |
| Saturable transformer core | 50038–2a (Magnetics, Inc. Butler, Pa.). |
| Maximum flux density | 14,000 Gauss. |
| Core area | 0.685 square centimeter. |
| Core mean length | 9.84 centimeters. |
| Winding 12a | 2 turns. |
| Winding 13a | 18 turns. |
| Winding 14a | 6 turns. |
| Winding 21 | 4 turns. |
| Source −$B_2$ | −8 volts. |
| Source −$B_3$ | −14 volts. |
| Source +B | 3 volts. |
| Battery 22 | 6 volts. |
| Battery 23 | 50 volts. |

From the foregoing description, it will be apparent that the pulse duration can be controlled by selection of hysteresis loop characteristic of the magnetic core, the turns ratios and the supply voltage and impedance values to stop the motor rapidly.

While the invention has particular utility in controlling a printed-circuit motor in a tape reader, it will be apparent that the circuit has other applications since it is effective to render conductive a power transistor automatically upon the termination of the conductivity of another transistor and is, therefore, effective to serve as a switching circuit for reversing the direction of current flow through a load. The circuit also has the advantage that the pulse generated at time $t_1$ across the tertiary winding 14 is of a polarity to drive the transistor 16 further into a nonconductive state at that time to make the circuit stable during the transient starting period.

A circuit constructed in accordance with the invention has the further advantages that the starting speed of the motor of a tape reader in the forward sense can be readily accelerated. The energization of the motor in the opposite sense can also be controlled in accordance with the period of operation of the motor in the forward sense to cause the motor to stop substantially instantaneously.

While there have been described what are at present believed to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

Having thus described my invention, what I claim and desire to protect by Letters Patent is:

1. A control circuit comprising: a pulse transformer including a saturable magnetic core and primary, secondary and tertiary windings magnetically coupled thereto; direct-current supply-circuit means including a direct-current source; normally nonconductive circuit means; a load coupled in series with said primary winding and said direct-current source and said normally nonconductive circuit means; circuit means for supplying a control pulse to said normally nonconductive circuit means to render said normally nonconductive circuit means conductive to pass current through said primary winding and said load to saturate said core in one sense and to energize said load; said direct-current supply-circuit means being effective to supply current flow through said secondary winding to saturate said core in the other sense and to develop an output pulse at said tertiary winding upon the termination of said control pulse, second normally nonconductive circuit means coupled to said load and to said direct-current supply-circuit means, said tertiary winding being coupled to said second normally nonconductive circuit means for rendering said second normally nonconductive circuit means conductive to energize said load in the other sense upon the termination of said control pulse.

2. A control circuit comprising: a pulse transformer including a saturable magnetic core and primary, secondary, and tertiary windings magnetically coupled thereto; direct-current supply-circuit means including a direct-current source; normally nonconductive circuit means; a load coupled to said direct-current supply-circuit means and to said primary winding, said load also being coupled to said normally nonconductive circuit means; circuit means for supplying a control pulse to said primary winding to saturate said core in one sense and to energize said load in one sense; said direct-current supply-circuit means being effective to supply current flow through said secondary winding to saturate said core in the other sense and to develop an output pulse at said tertiary winding upon the termination of said control pulse, said tertiary winding being coupled to said normally nonconductive circuit means for rendering said normally nonconductive circuit means conductive to energize said load in the other sense upon the termination of said control pulse.

3. A control circuit comprising: a pulse transformer including a saturable magnetic core and primary, secondary, and tertiary windings magnetically coupled thereto; a direct-current source; first and second normally nonconductive circuit means; a load coupled in series with said primary winding and said direct-current source and said first normally nonconductive circuit means; said load also being coupled in series with said tertiary winding and said direct-current source and said second normally nonconductive circuit means; circuit means for supplying a control pulse to said first normally nonconductive circuit means to render said first normally nonconductive circuit means conductive to pass current through said primary winding and said load to saturate said core in one sense and to energize said load in one sense; said secondary winding being coupled to said source for saturating said core in the other sense to develop an output pulse at said tertiary winding upon the termination of said control pulse; said tertiary winding being coupled to said second normally non-conductive circuit means for rendering said second normally nonconductive circuit means conductive to energize said load in the other sense upon the termination of said control pulse.

4. A control circuit comprising: a pulse transformer including a saturable magnetic core and primary, secondary, and tertiary windings magnetically coupled thereto; a direct-current source having three potential terminals; first and second normally nonconductive transistors; a motor coupled in series with said primary winding and across first and second terminals of said direct-current source and said first normally nonconductive transistor; said motor also being coupled in series with said second transistor and across second and third terminals of said direct-current source; circuit means for supplying a control pulse to said first transistor to render said first transistor conductive to pass current through said primary winding and said motor to saturate said core in one sense and to energize said motor in one sense; a resistor; said secondary winding being coupled to said source through said resistor for saturating said core in the other sense to develop an output pulse at said tertiary winding upon the termination of said control pulse; said tertiary winding being coupled to said second transistor for rendering said second transistor conductive to energize said motor in the other sense upon the termination of said control pulse to stop said motor.

5. A control circuit comprising: a pulse transformer including a saturable magnetic core and primary, secondary and tertiary windings magnetically coupled thereto; first direct-current supply means; a load coupled to said primary winding and to said first direct-current supply means; circuit means for supplying a control pulse to pass current through said primary winding and said load to saturate said core in one sense and to energize said load in one sense; second direct-current supply means including a condenser coupled to said load, said second direct-current supply means being responsive to said control pulse supply-circuit means for charging said condenser to a potential controlled by the duration of said control pulse; circuit means including said first direct-current supply means for supplying current flow through said secondary winding to saturate said core in the other sense and to develop at said tertiary winding upon the termination of said control pulse an output having a pulse duration controlled in accordance with the hysteresis loop characteristic of said transformer; and circuit means responsive to said output pulse at said tertiary winding and coupled in series relation with said condenser and with said load for passing current through said load in the other sense with an amplitude controlled by the potential on said condenser and with a duration controlled by said output pulse.

6. A control circuit comprising: a pulse transformer including a saturable magnetic core and primary, secondary and tertiary windings magnetically coupled thereto; first direct-current supply means; a normally nonconductive transistor; a motor coupled in series relation with said primary winding and said first direct-current supply means and said transistor; circuit means for supplying a control pulse to said transistor to render said transistor conductive to pass current through said primary winding and said motor to saturate said core in one sense and to energize said motor for rotation in one sense; second direct-current supply means including a condenser coupled to said motor, said second direct-current supply means being responsive to conduction of said transistor for charging said condenser to a potential controlled by the duration of said control pulse; circuit means including said first direct-current supply means for supplying current flow through said secondary winding to saturate said core in the other sense and to develop at said tertiary winding upon the termination of said control pulse an output pulse having a pulse duration controlled in accordance with the hysteresis loop characteristic of said transformer; and circuit means responsive to said output pulse at said tertiary winding and coupled in series relation with said condenser and with said motor for passing current through said motor for energization in the other sense, said motor current having an amplitude controlled by the potential on said condenser and having a duration controlled by said output pulse.

7. A control circuit comprising: a pulse transformer including a saturable magnetic core and primary, secondary, tertiary and fourth windings magnetically coupled thereto; direct-current supply means; first and second normally nonconductive circuit means; a load coupled to said primary winding and to said direct-current supply means and to said first and second normally nonconductive circuit means; circuit means for supplying a control pulse to said first normally nonconductive circuit means to render said first normally nonconductive circuit means conductive to pass current through said primary winding and said load to saturate said core in one sense and to energize said load; said fourth winding being so coupled to said second normally nonconductive circuit means as to render said second normally nonconductive circuit means conductive during the initial portion of said control pulse prior to saturation of said core to increase the current flow through said load during the initial portion of said control pulse; and circuit means including said direct-current supply means for supplying current flow through said secondary winding to saturate said core in the other sense and to develop an output pulse at said tertiary winding upon the termination of said control pulse.

8. A control circuit comprising: a pulse transformer including a saturable magnetic core and primary, secondary, tertiary and fourth windings magnetically coupled thereto; direct-current supply means; first and second normally nonconductive transistors; a motor coupled to said primary winding and to said direct-current supply means and to said transistors; circuit means for supplying a control pulse to said first transistor to render said first transistor conductive to pass current through said primary winding and through said motor to saturate said core in one sense and to energize said motor for rotation in one sense; said fourth winding being so coupled to said second transistor as to render said second transistor conductive during the initial portion of said control pulse prior to saturation of said core to increase the current flow through said motor during the initial portion of said control pulse to accelerate said motor during the initial portion of said control pulse; and circuit means including said direct-current supply means for supplying current flow through said secondary winding to saturate said core in the other sense and to develop an output pulse at said tertiary winding upon the termination of said control pulse.

References Cited by the Examiner

UNITED STATES PATENTS

| | | | |
|---|---|---|---|
| 2,892,998 | 6/59 | Eckert et al. | 307—88 X |
| 2,901,636 | 8/59 | Torrey et al. | 307—88 |
| 3,060,322 | 10/62 | Erickson et al. | 307—88 |
| 3,073,967 | 1/63 | Phillips | 307—88.5 |
| 3,108,258 | 10/63 | Eckl | 307—88 |

FOREIGN PATENTS

| | | |
|---|---|---|
| 1,072,693 | 1/60 | Germany. |

ORIS L. RADER, *Primary Examiner.*

MILTON O. HIRSHFIELD, *Examiner.*

UNITED STATES PATENT OFFICE
CERTIFICATE OF CORRECTION

Patent No. 3,182,243                                        May 4, 1965

Robert P. Burr

It is hereby certified that error appears in the above numbered patent requiring correction and that the said Letters Patent should read as corrected below.

Column 7, line 72, after "output" insert -- pulse --.

Signed and sealed this 19th day of October 1965.

(SEAL)
Attest:

ERNEST W. SWIDER                                EDWARD J. BRENNER
Attesting Officer                                      Commissioner of Patents